US011524785B2

(12) United States Patent
Alam (10) Patent No.: US 11,524,785 B2
(45) Date of Patent: Dec. 13, 2022

(54) TRAY TABLE PILLOW FOR AIRCRAFT PASSENGER SEAT (71) Applicant: Ryan R. Alam, Houston, TX (US)

(72) Inventor: Ryan R. Alam, Houston, TX (US)

(*) Notice: Subject to any disclaimer, the term of this patent is extended or adjusted under 35 U.S.C. 154(b) by 0 days.

(21) Appl. No.: 17/470,360

(22) Filed: Sep. 9, 2021

(65) Prior Publication Data

US 2022/0081117 A1 Mar. 17, 2022

Related U.S. Application Data (60) Provisional application No. 63/204,104, filed on Sep. 11, 2020.

(51) Int. Cl.
B64D 11/06 (2006.01)
(52) U.S. Cl.
CPC ...... B64D 11/0642 (2014.12); B64D 11/0638 (2014.12)
(58) Field of Classification Search
CPC .................. B64D 11/0642; B64D 11/0638
See application file for complete search history.

(56) References Cited

U.S. PATENT DOCUMENTS

| 4,159,071 | A  | * | 6/1979 | Roca | B64D 11/0638 108/42 |
| 6,619,733 | B2 | * | 9/2003 | Pearson | B64D 11/0642 297/391 |
| 9,930,977 | B1 | * | 4/2018 | Jennings | B64D 11/06205 |
| 2003/0193220 | A1 | * | 10/2003 | Jensen | B64D 11/0638 297/146 |

* cited by examiner

Primary Examiner — Anthony D Barfield
(74) Attorney, Agent, or Firm — Richard A. Fagin (57) ABSTRACT A tray table pillow combination for a passenger seat has a table rotatably coupled on each side to a support arm. The table has a utility surface and a cushioned surface on an opposed surface. The support arms are pivotally coupled to either a barrier or another seat forward of the passenger seat. Each arm has a seat connecting segment pivotally coupled to the barrier or other seat, and a table connecting segment slidably engaged with the seat connecting segment. The table is rotatably coupled to the table connecting segment. A detent mechanism is cooperatively engaged between the table connecting segment and the seat connecting segment to selectively lock and release slidable engagement of the seat connecting segment with the table connecting segment. A rotation lock is cooperatively engaged between the table connecting segment and the table on at least one of the support arms.

5 Claims, 8 Drawing Sheets

TRAY TABLE PILLOW FOR AIRCRAFT PASSENGER SEAT

CROSS REFERENCE TO RELATED APPLICATIONS

Priority is claimed from U.S. Provisional Application No. 63/204,104 filed on Sep. 11, 2020 and incorporated herein by reference in its entirety.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable.

BACKGROUND

This disclosure relates to the field of passenger seats in passenger vehicles such as aircraft. More particularly, the disclosure relates to an improved mechanism for operating a tray table disposed in a conventional tray table fixture on the back of a passenger seat, wall or barrier that can service a combined purpose as a pillow for passenger comfort. The improved mechanism may provide better function as to opening, stowing and adjusting a tray table.

As is known in the art, a surface provided behind a seat, such as a tray or a table, may be used for beverage consumption, support of objects such as electronic apparatus, by passengers in a seat behind a seat row to which the tray table is affixed.

Reduced longitudinal spacing (pitch) between successive seats or rows of seats in passenger aircraft has put space for passenger amenities at a premium. Options for passenger rest in such close accommodations may be limited.

It is desirable for a the tray table support mechanism to provide a stowed position, with the table coupled with the rear wall of the forward seat, and at least an open or use position, in which the table surface may be adjusted or rotated. Such a tray table mounting system is presently unavailable, that is, a system that permits angular motion of the tray, and that enables raising the table up and down to avoid interference between the tray table and passenger's knees.

There is a need for devices to provide passengers with additional comfort options while making good use of limited available longitudinal space between seats.

SUMMARY

One aspect of the present disclosure is a tray table pillow combination for a passenger vehicle seat. A tray table pillow combination according to this aspect of the disclosure has a table rotatably coupled on each side to a support arm. The table has a utility surface on one surface and a cushioned surface on an opposed surface. The support arms are pivotally coupled to either a barrier or another seat forward of the passenger seat. Each arm comprises a seat connecting segment pivotally coupled to the barrier or the other seat, and a table connecting segment slidably engaged with the seat connecting segment. The table is rotatably coupled to the table connecting segment. A detent mechanism is cooperatively engaged between the table connecting segment and the seat connecting segment to selectively lock and release slidable engagement of the seat connecting segment with the table connecting segment. In this way, the user can select height of the table. A rotation lock is cooperatively engaged between the table connecting segment and the table on at least one of the support arms so that the user can select a rotary orientation of the table.

In some embodiments, the detent mechanism comprises a spring pin coupled to one of the table connecting segment and the seat connecting segment, and a plurality of spaced apart openings in the other of the seat connecting segment and the table connecting segment. The spring pin is operable by a user to retract from one of the plurality of spaced apart openings, the spring pin urged by a spring to extend into one of the plurality of spaced apart openings when released by the user.

In some embodiments, the rotation lock comprises a blocking plate and an anti-rotation plate arranged on a pivot pin extending between the table and the support arm, the blocking plate and the anti-rotation plate arranged to enable rotation of the table in a first direction and to stop rotation of the table in a direction opposed to the first direction.

In some embodiments, the anti-rotation plate is connected to the table by at least one pin.

In some embodiments, the cushion surface comprises an integral cushion.

Some embodiments further comprise a pillow attached to the cushion surface.

In some embodiments, the detent mechanism comprises a pivot arranged to couple the seat connecting segment to the table connecting segment wherein the table connecting segment is rotatable with respect to the seat connecting segment. At least one locking tab extends from within the table connecting segment into the seat connecting segment. The at least one locking tab is offset from the pivot to rotationally lock the table connecting segment with respect to the seat connecting segment. An operating rod is engaged with the at least one locking tab and coupled to a single control, such that moving the single control retracts the at least one locking tab to enable both rotation and sliding motion of the table connecting segment with respect to the seat connecting segment.

Other aspects and possible advantages will be apparent from the description and claims that follow.

DETAILED DESCRIPTION

Figure 1:
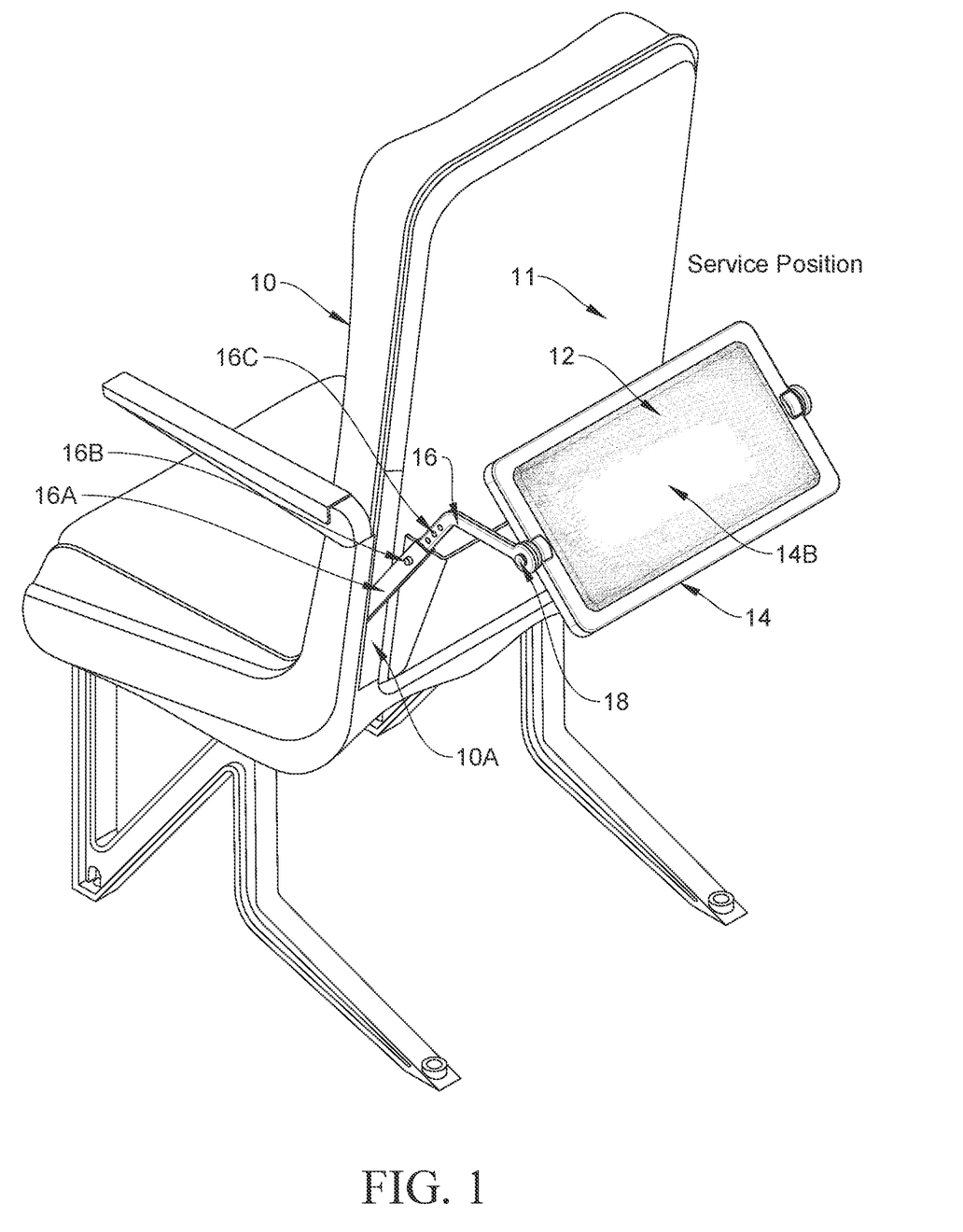
FIG. 1 shows an oblique view of an example embodiment of a tray table pillow combination with a pillow surface oriented toward the passenger.

An example embodiment of a tray table pillow 11 according to the present disclosure is shown in FIG. 1 in a possible position to be used as a pillow or head rest by an aircraft passenger. The tray table pillow 11 may be connected to the adjacent passenger seat 10 ("forward seat") longitudinally ahead of the user passenger as is the case for aircraft tray tables known in the art. In the case of the user passenger seat being a front row seat, thus having no forward seat, the tray table pillow 11 may be coupled to a forward barrier or wall instead. The tray table pillow 11 may comprise a table 14 rotatably coupled to a support arm 16 on each lateral side of the table. Such coupling may be provided by a locking pivot 18 of types known in the art disposed between respective lateral edges of the table 14 and the support arms 16. An example embodiment of a locking pivot will be explained with reference to FIG. 7.

The support arms 16 may each comprise a seat connecting segment 16A pivotally coupled to part of the forward seat 10 such that when in a stowed position the seat connecting segment 16A is disposed within a pocket or recess 10A in the forward seat 10. The seat connecting segments 16A may be pivotally coupled to the forward seat 10 as in conventional for aircraft tray tables known in the art. Each support arm 16 may comprise a table connecting segment 16C that slidably engages the seat connecting segment 16A, and may be locked in a plurality of different extension lengths with reference to the seat connecting segment 16A by a detent mechanism, an example embodiment of which will be explained with reference to FIGS. 6A and 6B. In the present example embodiment, the detent mechanism may comprise a spring loaded pin 16B that may be extended through any one of a plurality of spaced apart slots or holes 16C-1 disposed along the length of the table connecting segment 16C. The table connecting segment 16C may comprise a tray table mounting segment 16C-2 that may subtend an angle with respect to that part of the table connecting segment 16C that engages the seat connecting segment 16A, such that when the support arms 16 are fully pivotally extended from the forward seat, the tray table mounting segments 16C-2 are substantially horizontal. Such angle may be subtended in a plurality of different ways, non-limiting example of which include limited movement hinges and a fixed angle formed within the structure of the table mounting segment 16C-2 either as a single part or as fixedly joined parts.

The table 14 may comprise a cushion surface 14B, which may be integrally padded or cushioned, or a separately attachable pillow 12 disposed on the cushion surface 14B as shown. The pillow 12 may be mounted to the cushion surface 14B, for example and without limitation using hook and loop fasteners (not shown) having corresponding parts affixed to the cushion surface 14B and to the pillow 12. One example of such hook and loop fasteners is sold under the trademark VELCRO, which is a registered trademark of Velcro IP Holdings LLC, Manchester, N.H.

Figure 2:
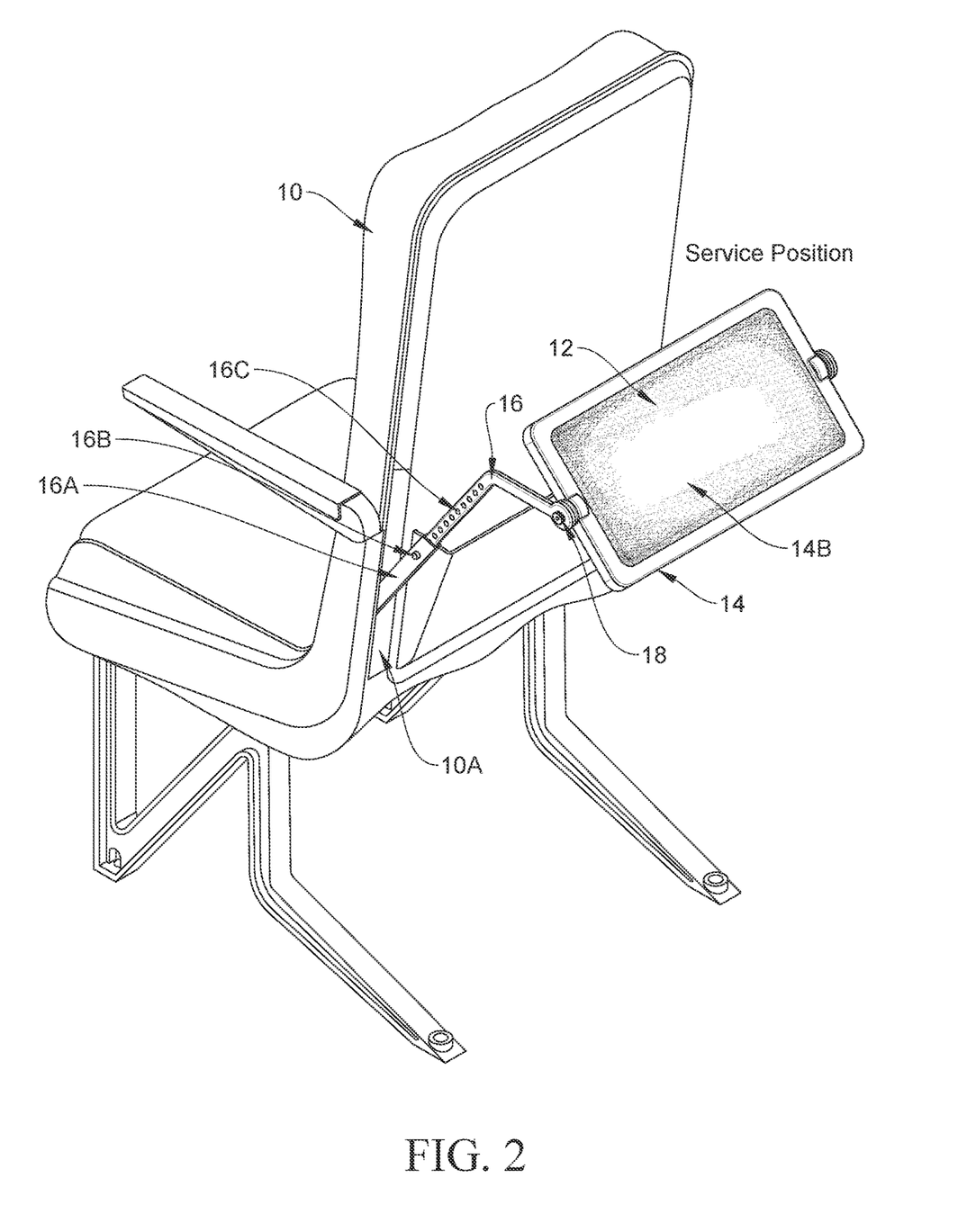
FIG. 2 shows a view similar to FIG. 1 wherein extension arms are more fully extended than in FIG. 1.

As previously explained, the supporting arms 16 comprise a table mounting segment 16C that is engageable with a seat connecting segment 16A so that an effective length of the supporting arms 16 with reference to the mounting point on the forward seat 10 may be adjusted by the user to change the height of the table 14. FIG. 2 shows the example embodiment of FIG. 1, in which the supporting arms 16 extended to a greater length than in FIG. 1, by operating the spring pin 16B be to enable sliding the tray table connecting segment 16C with reference to the seat connecting segment and subsequent release of the spring pin 16B to engage a slot of hole 16C-1 further along the length of the table connecting segment 16C.

Figure 3:
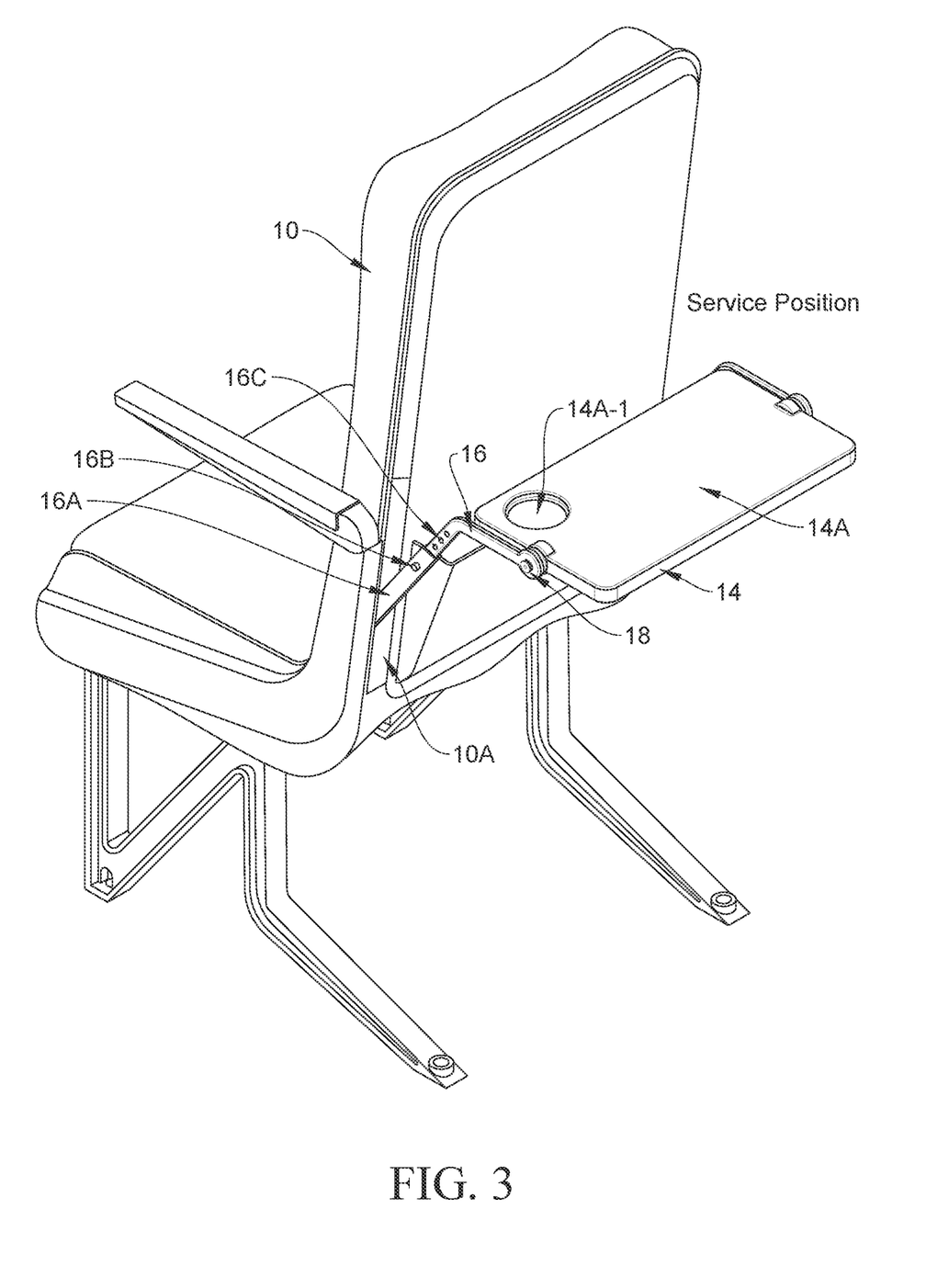
FIG. 3 shows the tray table pillow combination of FIG. 1 with the tray table oriented toward the passenger in its as-used position.

FIG. 3 shows the example embodiment of FIG. 1 and FIG. 2 wherein the table 14 is oriented in a position to be used as a conventional tray table. In such position, a tray table surface 14A is oriented in substantially in a horizontal plane. The table surface 14A may comprise a recess, or opening 14A-1 (having an internal bottom in such case) for placing a beverage cup as is found on aircraft tray tables known in the art.

Figure 4:
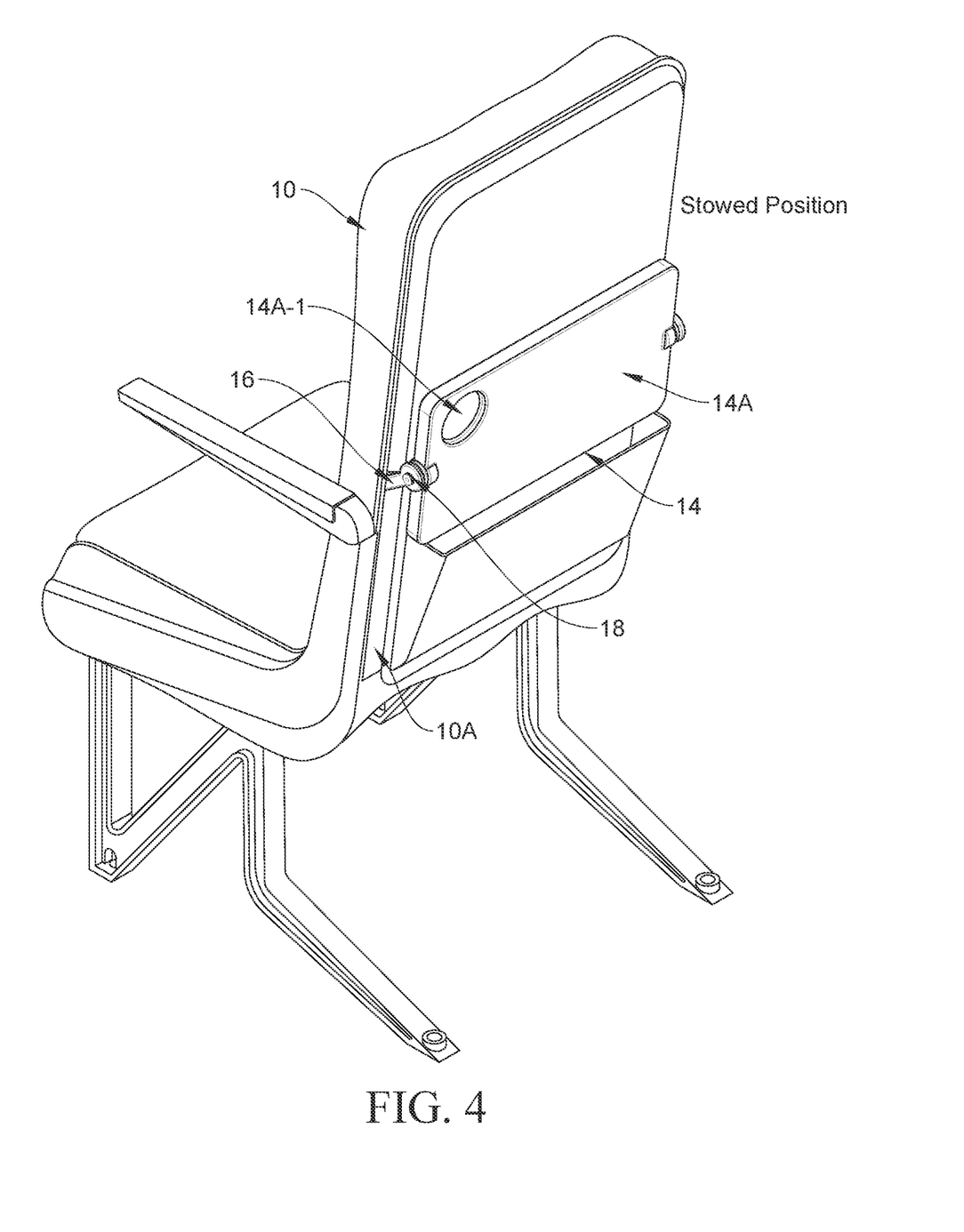
FIG. 4 shows the tray table pillow combination of FIG. 1 in the stowed position as required for aircraft takeoff and landing.

FIG. 4 shows the example embodiment of FIGS. 1 through 3 in the stowed position as is required for aircraft takeoff and landing. The table surface 14A may be oriented outwardly from the forward seat 10 to reduce accumulation of dirt on the pillow (12 in FIG. 1) when the tray table pillow 11 is not in use by a passenger.

Figure 5:
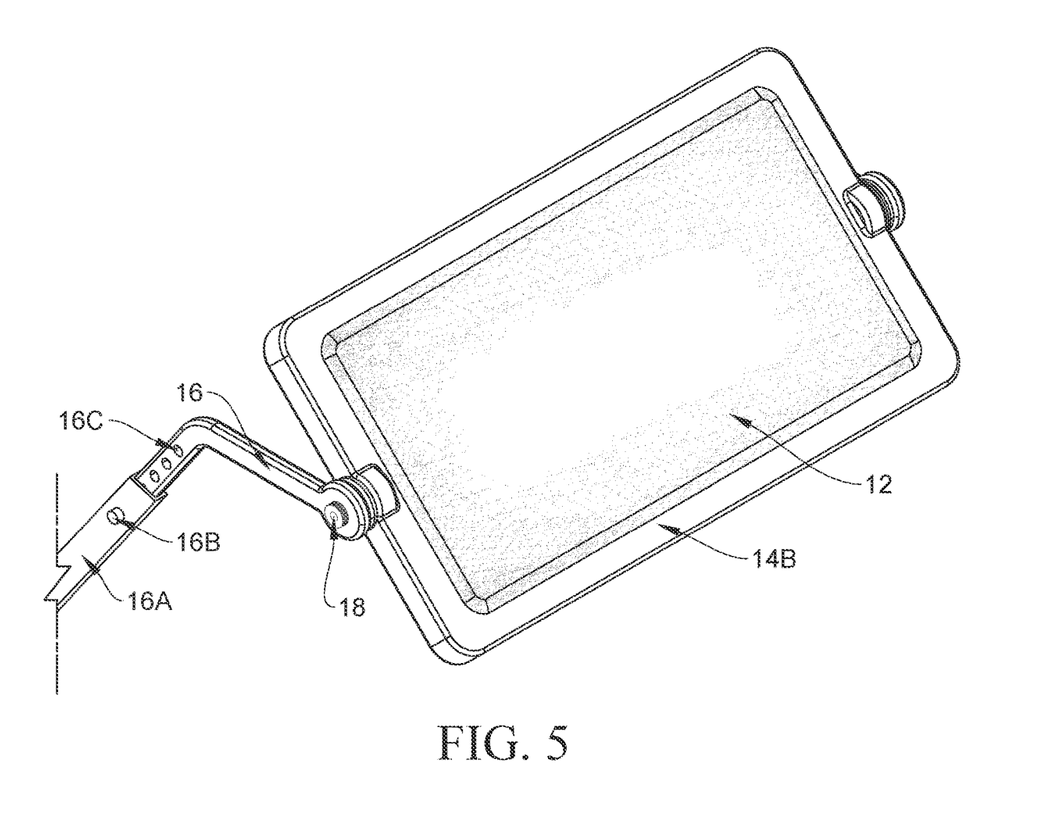
FIG. 5 shows an enlarged view of the tray table pillow combination shown in FIG. 1.

FIG. 5 shows the example embodiment of FIG. 1 in expanded view to better illustrate certain features of the present example embodiment such as the spring pin 16B and slots or holes 16C-1.

Figure 6A:
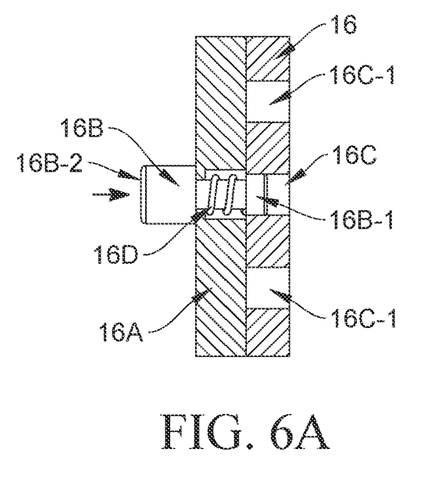
FIGS. 6A and 6B show an example embodiment of a detent mechanism used in connection with the extension arms explained with reference to FIGS. 1 and 2.
Figure 6B:
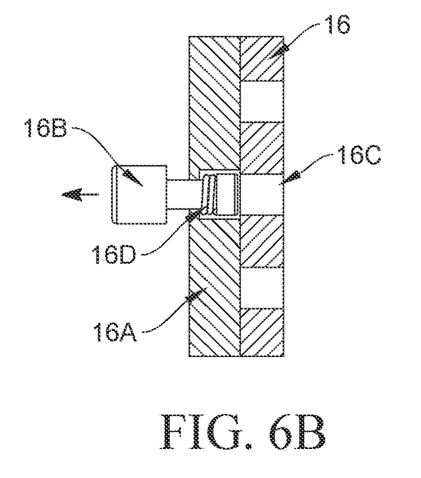

An example embodiment of a detent mechanism used to enable locking adjustment of a length of the supporting arms (16 in FIG. 1) is shown in FIGS. 6A and 6B. In FIG. 6A, the spring pin 16B is shown in its rest position by the user wherein a return spring 16D, extending between a locking pin end 16B-1 of the spring pin 16B and a user pull end 16B-2 of the spring pin 16B, urges the spring pin in the direction shown by the arrow so that the locking pin end 16B-1 engages one of the slots or holes 16C-1 in the table mounting segment. Referring to FIG. 6B, when the user pulls on the user pull end 16B-2, the locking pin end 16B-1 is withdrawn from one of the slots or holes 16C-1 in the table mounting segment 16C. The table mounting segment 16C may then be moved with reference to the seat connecting segment 16A to change the length of the supporting arms (16 in FIG. 1) as the user may wish. When the user releases the user pull end 16B-2, the spring pin 16B is urged by the spring 16D to return to the position shown in FIG. 6A and thereby engage one of the slots or holes 16C-1 to lock the table mounting segment 16C position with reference to the seat connecting segment 16A.

Figure 7:
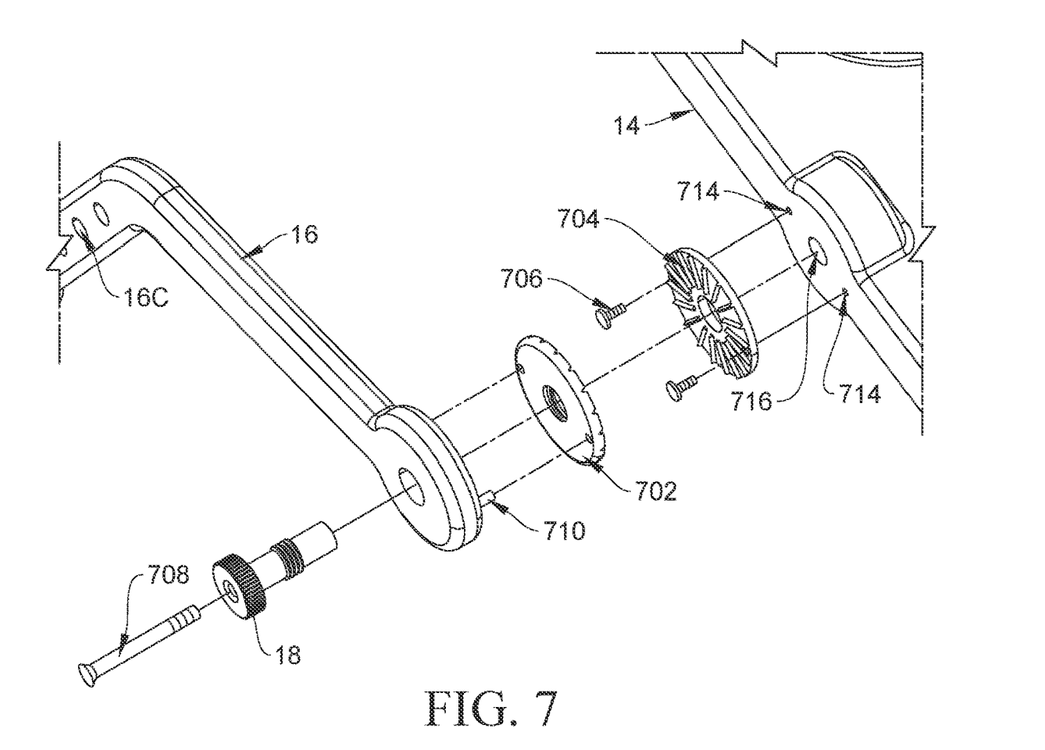
FIG. 7 shows an example embodiment of a locking pivot to connect the table shown in FIG. 1 with the support arms shown in FIG. 1.

An example embodiment of a locking pivot 18 is shown in exploded view in FIG. 7. The locking pivot may be a fastener that blocks the rotation of the table in one direction and allows the rotation of the table in the opposite direction.

The locking pivot 18 is connected to a blocking plate 702 through a lead-screw mechanism. When the locking pivot 18 is rotated in a first, e.g., clockwise direction, the blocking plate 702 moves in a forward direction and engages with an anti-rotation plate 704 which results in blocking the rotation of the table 14. The blocking plate 702 slides over a guide pin 710. During opposed direction, e.g., counterclockwise, rotation, the blocking plate 702 moves or slides in a backward direction and disengages from the anti-rotation plate 704, allowing the rotation of the table 14. The anti-rotation plate 704 is fixed to the table 14 through fasteners 706, e.g., pins or screws that engage corresponding openings 714 in the side surface of the table 14. Further, there is shown a pivot pin 708 that pivotally connects the table 14 and the supporting arm 16. Only one side of the table 14 is shown in FIG. 7. The other side of the table 14 may have a similar locking pivot or may simply have a conventional pivot.

Figure 8:
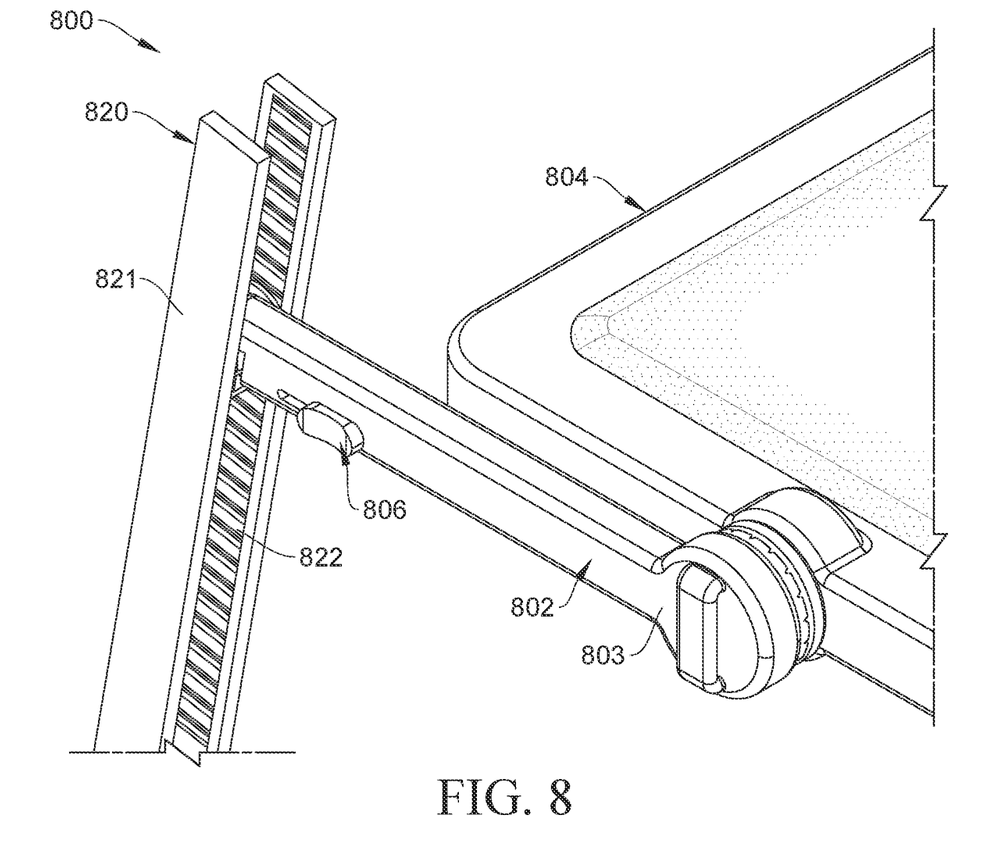
FIG. 8 shows an example embodiment of a pivoting table connecting segment of the support arm shown in FIG. 1, with a single release button to enable both sliding and pivoting motion of the table connecting segment.
Figure 9:
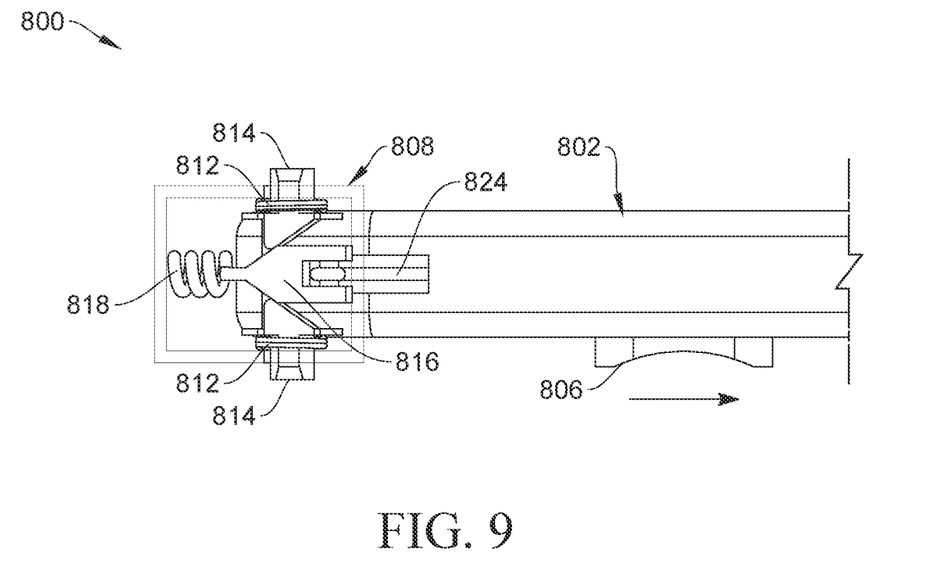
FIG. 9 shows a cross-sectional view of a pivot head portion of the table connecting segment shown in FIG. 8.
Figure 10:
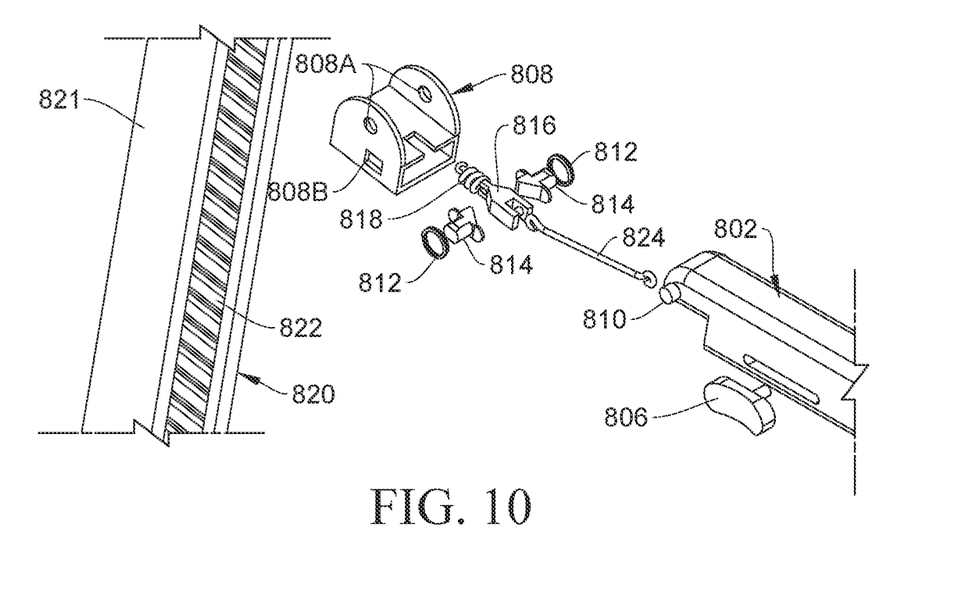
FIG. 10 shows an exploded view of the latching and releasing parts of the table connecting segment shown in FIG. 8 and FIG. 9.

FIGS. 8 through 10 show another example embodiment in which the support arms (16 in FIG. 1) may be folded for stowing the tray table pillow as needed by operating only a single button, switch or other control. In such embodiment, the detent mechanism, shown in and explained with reference to FIGS. 1 through 3, may have features to enable both rotation of the table connecting segment of the support arms and rotating motion of the table connecting segment with respect to the seat connecting segment.

FIG. 8 shows the tray table pillow 800 in which the table 14 may be pivotally coupled to the support arms 820, specifically, to the table connecting segment 802, by a lockable pivot 803, which may have features and function as in other embodiments described herein. In the present example embodiment, the table connecting segment 802 may be coupled to the seat connecting segment 821 by a detent mechanism comprising a combination locking device (see 840 in FIG. 9) that enables the table connecting segment 802 both to move longitudinally along the seat connecting segment 821 and to rotate relative to the seat connecting segment 821 when a single control 806, which may be a button, switch or other finger operated control, is depressed by the user. When the table 804 is oriented as shown in FIG. 8 with respect to the table connecting segment 802, that is, generally in the same plane, then user operating the control 806 will enable the table 14 to be moved both to a particular longitudinal position along the seat connecting segment 821 and to pivot to be substantially parallel to the forward seat or barrier (as explained with reference to FIGS. 1 through 3). Such feature may facilitate stowing the tray table pillow 800 when required during flight or other vehicle operation.

FIGS. 9 and 10 show, respectively, a cross-sectional view and an exploded view of an example embodiment of the combination locking device 840 in order to provide better understanding of its components and functions. The various components may be disposed internally to the table connecting segment 802 as shown. The control 806 may be functionally coupled to a lock operating rod 824 or similar longitudinally moving element such that the user depressing the control 806 causes corresponding longitudinal motion of the lock operating rod 824.

In the present example embodiment, one end of the table connecting segment 802 opposed to the longitudinal end pivotally coupled to the table (14 in FIG. 8) may be pivotally coupled to the seat connecting segment (821 in FIG. 8) by a height adjuster 808. The height adjuster 808 may have such pivotal coupling by means of a pin 810 extending from each lateral side of the table connecting segment 802 through a corresponding opening 808A in the height adjuster 808. The operating rod 824 may pull on a tapered surface pin extender 816 when the control 806 is depressed. When the control 806 is not depressed, a spring 818 pulls the pin extender (and the connected operating rod 824) away from the table connecting segment 802. The tapered surface of the pin extender 816 thereby urges outwardly laterally one or more locking tabs 814. The locking tabs 814 extend outward from the height adjuster 808 through corresponding opening 808B in the height adjuster 808. In such position, the locking tabs 814 engage one of a plurality of longitudinally spaced apart slots 822 in the seat connecting segment. Such action locks motion of the height adjuster 808 along the seat connecting segment 821 and locks rotation of the table connecting segment 802 with respect to the seat connecting segment 821. When the control 806 is depressed, the pin extender 816 is urged away from the height adjuster 808 so that springs 812 disposed between the locking tabs 814 and the sides of the height adjusted 808 urge the locking tabs 814 inwardly. In this way, the height adjuster 808 is released so that it may move longitudinally along the seat connecting segment 821 and the table connecting segment 802 is able to rotate with respect to the seat connecting segment 821. The foregoing enables the user to return the tray table pillow (800 in FIG. 8) to the stowed position while operating only a single control, thereby preserving much of the convenience of a conventional passenger tray table.

Although the present example embodiment is described with reference to aircraft passenger seats, it will be appreciated by those skilled in the art that the tray table pillow according to the present disclosure may be used in any type of vehicle having any form of barrier, wall or vertically extending device in front of a passenger seat. Thus the tray table pillow of the present disclosure may be attached as described to a forward wall or barrier in front of a seat having no forward seat longitudinally ahead of it. The tray table pillow of the present disclosure may be used in any type of vehicle, including, without limitation, automotive vehicles, trains and buses.

The resulting possible benefits of a rotatable table usable as both a utility table and a head rest, which is also adjustable to a desired height and angled positions pillow during air travel are many.

For example, the pillow or cushion can alleviate neck cramps, neck pain, headaches, back pain, incorrect posture leading to cervical issues etc. These illnesses are a principal reason for claimed injury in airline travel.

The adjustable height of the table and its angular position may benefit passengers in other ways for example, possibly preventing head and neck stiffness, and restless eyes from glare. For example, using tray tables known in the art prior to the present disclosure, the only way for the user to see the screen of portable electronic devices such as phones and computers is for the user to look downward onto the tray where the portable electronic device sits. The prolonged bending of the head and neck may be alleviated, for example, by fastening the portable electronic device onto the table (tray face), e.g., using a horizontal plastic bracket with a lip at the bottom of the tray to hold the electronic device, then adjusting the table to a desired height and a desired angle. This viewing capability allows the user's head and neck to be in restful position closer to the back of the seat instead of in a leaning position.

In light of the principles and example embodiments described and illustrated herein, it will be recognized that the example embodiments can be modified in arrangement and detail without departing from such principles. The foregoing discussion has focused on specific embodiments, but other configurations are also contemplated. In particular, even though expressions such as in "an embodiment," or the like are used herein, these phrases are meant to generally reference embodiment possibilities, and are not intended to limit the disclosure to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another, unless indicated otherwise. Although only a few examples have been described in detail above, those skilled in the art will readily appreciate that many modifications are possible within the scope of the described examples. Accordingly, all such modifications are intended to be included within the scope of this disclosure as defined in the following claims.

What is claimed is:

1. A tray table pillow combination for a first vehicle passenger seat, comprising:
   a table rotatably coupled on each side to a support arm, the table comprising a utility surface on one face and a cushion surface on an opposed face;
   wherein the support arms are pivotally coupled to either a barrier or a second passenger seat longitudinally forward of the first vehicle passenger seat, the support arms each comprising a seat connecting segment pivotally coupled to the barrier or the second passenger seat, and a table connecting segment slidably engaged with the seat connecting segment, the table rotatably coupled to the table connecting segment;
   a detent mechanism cooperatively engaged between the table connecting segment and the seat connecting segment of at least one of the support arms, the detent mechanism operable to selectively lock and release slidable engagement of the seat connecting segment with the table connecting segment to enable user selectable length of the support arms; and
   a rotation lock cooperatively engaged between the table connecting segment and the table on at least one of the support arms, the rotation lock operable to hold the table in selected rotary positions with reference to the support arms.

2. The combination of claim 1 wherein the detent mechanism comprises a spring pin coupled to one of the table connecting segment and the seat connecting segment, and a plurality of spaced apart openings the other of the seat connecting segment and the table connecting segment, wherein the spring pin is operable by a user to retract from one of the plurality of spaced apart openings, the spring pin urged by a spring to extend into one of the plurality of spaced apart openings when released by the user.

3. The combination of claim 1 wherein the rotation lock comprises a blocking plate and an anti-rotation plate arranged on a pivot pin extending between the table and the support arm, the blocking plate and the anti-rotation plate arranged to enable rotation of the table in a first direction and to stop rotation of the table in a direction opposed to the first direction.

4. The combination of claim 3 wherein the anti-rotation plate is connected to the table by at least one pin.

5. The combination of claim 1 wherein the detent mechanism comprises:
   a pivot arranged to couple the seat connecting segment to the table connecting segment wherein the table connecting segment is rotatable with respect to the seat connecting segment;
   at least one locking tab extending from within the table connecting segment into the seat connecting segment, the at least one locking tab offset from the pivot to rotationally lock the table connecting segment with respect to the seat connecting segment; and
   an operating rod engaged with the at least one locking tab and coupled to a single control, such that moving the single control retracts the at least one locking tab to enable both rotation and sliding motion of the table connecting segment with respect to the seat connecting segment.

\* \* \* \* \*